United States Patent [19]

Kraus

[11] Patent Number: 4,482,663

[45] Date of Patent: Nov. 13, 1984

[54] RUBBER COMPOSITIONS COMPRISING A SILICEOUS FILLER IN COMBINATION WITH AN ORGANOSULFUR SUBSTITUTED PYRIDINE PROMOTOR

[75] Inventor: Gerard Kraus, Bartlesville, Okla.

[73] Assignee: Phillips Petroleum Company, Bartlesville, Okla.

[21] Appl. No.: 397,399

[22] Filed: Jul. 12, 1982

[51] Int. Cl.³ ............................................. C08K 3/36
[52] U.S. Cl. ..................................... 524/99; 524/493; 524/575; 525/348; 525/359.2
[58] Field of Search ............... 525/348, 359.2; 524/99, 524/493, 575; 260/792

[56] References Cited

U.S. PATENT DOCUMENTS

| | | | |
|---|---|---|---|
| 3,346,544 | 10/1967 | Ayad et al. ........................... | 525/348 |
| 3,624,029 | 11/1971 | Yokohama ........................... | 524/190 |
| 3,798,196 | 3/1974 | Rocktaschel et al. ......... | 260/41.5 A |
| 3,869,435 | 3/1975 | Trivette ............................... | 525/349 |
| 4,156,677 | 5/1979 | Williams et al. ..................... | 523/213 |
| 4,201,698 | 5/1980 | Itoh et al. ............................ | 260/3 |

OTHER PUBLICATIONS

Translation "A Study of the Possibility of using 2-mercapto-4-methylpyrimidine HCl as an Accel. for Sulfur Vulcanization of Unsat. Rubbers in Industrial Stock", Kozhemyachko et al., (1975, pp. 12–14), Proizodstvo shin, RTI i ATI, #4, 1975.
Chem. Abs. 84–18867, (1976), Kozhemyachko et al.

*Primary Examiner*—Herbert J. Lilling
*Attorney, Agent, or Firm*—Howard D. Doescher

[57] ABSTRACT

This invention relates to the use of organo-sulfur substituted pyridine compounds as reinforcing promoters and coupling agents for silica filled rubber compositions.

17 Claims, No Drawings

RUBBER COMPOSITIONS COMPRISING A SILICEOUS FILLER IN COMBINATION WITH AN ORGANOSULFUR SUBSTITUTED PYRIDINE PROMOTOR

This invention relates to reinforcing promoters for rubber compositions. In accordance with another aspect, this invention relates to the use of organosulfur-substituted pyridine compounds as reinforcing promoters for silica-filled rubber compositions. In accordance with a further aspect, this invention relates to silica-containing vulcanizable rubber compositions containing organosulfur-substituted pyridine compounds as reinforcing promoters and coupling agents. In still another aspect, this invention relates to products obtained by curing silica-containing vulcanizable rubber compositions containing organosulfur-substituted pyridine compounds as reinforcing promoters and coupling agents.

BACKGROUND OF THE INVENTION

Carbon black has historically been the reinforcing agent of choice for rubber-based products such a tires and extruded and molded goods. Carbon black, which is produced by the thermal decomposition of oil and natural gases, greatly enhances mechanical strength and resistance to abrasion, and as in the past has been an economically attractive approach to improving the physical properties of rubber products. However, the increasing demand for other oil or gas-derived petrochemicals combined with a decreasing supply of oil and natural gas has prompted searches for a carbon black replacement.

Reinforcing silica's higher costs and poor performances has previously prevented it from competing with carbon black as a reinforcing agent for rubber. However, with recent and projected oil and gas price increases amorphous and fine particle-size silicas have become economically competitive with carbon black. A major effort to make reinforcing silica competitive with carbon black on a performance basis has evolved as a result of these changing economical factors. One approach is the incorporation into the rubber recipe of reinforcing promoters or coupling agents to effectively bond the silica to the rubber. It has now been found that pyridines having sulfur-containing side groups can act as coupling agents for vulcanizable rubber compositions and greatly enhance the stress-strain moduli of such compositions.

Accordingly an object of this invention is to provide vulcanizable rubber compositions exhibiting improved product properties.

Another aspect of this invention to provide novel rubber reinforcing promoters.

A further object of this invention is to provide improved vulcanizable silica-containing rubber compositions.

A further object of this invention is to provide reinforcing promoters that will effectively bond the reinforcing materials to rubber.

Other objects, aspects as well as the several advantages of the invention will be apparent to those skilled in the art upon reading the specification and the appended claims.

SUMMARY OF THE INVENTION

Broadly, the present invention comprises use of organosulfur-substituted pyridine compounds as coupling agents and reinforcing promoters to significantly enhance the effectiveness of siliceous materials used as reinforcing fillers for rubber products.

More specifically, in accordance with the invention, vulcanizable rubber compositions are provided comprising a curable rubber polymer, a silica-based filler, and at least one organosulfur-substituted pyridine compound as coupling agent and reinforcing promoter which aids in effectively bonding the silica-based filler to the rubber upon curing the rubber composition.

In accordance with still another embodiment of the invention, a process is provided for enhancing the effectiveness of silica-containing materials as reinforcing fillers in vulcanizable rubber compositions which comprises effectively bonding the silica-containing material to the rubber by incorporating therein a promoting amount of at least one organosulfur-substituted pyridine compound, which amount is sufficient to enhance the effectiveness of siliceous materials used as reinforcing fillers for rubber compositions.

DETAILED DESCRIPTION OF THE INVENTION

The organosulfur-substituted pyridine reinforcing promoters and coupling agents employed in this invention have one of the following structural formulas:

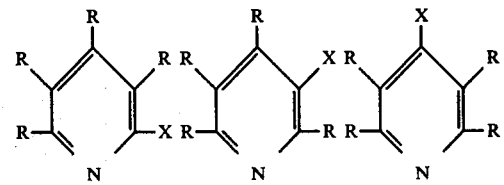

wherein R is hydrogen or an alkyl radical having from 1 to about 6 carbon atoms such as methyl, ethyl, propyl, hexyl, and the like, or mixtures thereof, and X is selected from a group of radicals consisting of $-SR^1$, $-R^3-SR^1$ and

wherein $R^1$ and $R^2$ are hydrogen or an alkyl radical having from 1 to about 6 carbon atoms such as methyl, ethyl, propyl and the like or mixtures thereof and $-R^3$ is an alkylene radical having from 1–4 carbon atoms such as $-CH_2-$, $-CH_2-CH_2-$ and the like.

Examples of organosulfur-substituted pyridines employed in this invention are: 2-mercaptopyridine, 3-mercaptopyridine, 4-mercaptopyridine, 2-(mercaptomethyl)pyridine, 3-(mercaptomethyl)pyridine, 4-(mercaptomethyl)pyridine, 2-(2-mercaptoethyl)pyridine, 3-(2-mercaptoethyl)pyridine, 4-(2-mercaptoethyl)pyridine, 2-(3-mercaptopropyl)pyridine, 3-(3-mercaptopropyl)pyridine, 4-(2-mercaptopropyl)pyridine, 2-(4-mercaptobutyl)pyridine, 2-(5-mercaptopentyl)pyridine, 3-(4-mercaptopentyl)pyridine, 3-(6-mercaptohexyl)pyridine, 4-(5-mercaptohexyl)pyridine, 2-mercapto-3-methylpyridine, 2-mercapto-3-ethylpyridine, 2-mercapto-4-methylpyridine, 2-mercapto-5-ethylpyridine, 2-mercapto-5-methylpyridine, 2-mercapto-6-propylpyridine, 3-mercapto-2-methylpyridine, 4-mercapto-2-methylpyridine, 4-mercapto-2,6-dimethylpyridine, thionicotinamide, N-methyl-thionicotinamide, N,N-dimethylthionicotinamide, N,N-diethylthionicotinamide, N-propyl-thionicotinamide, and the like, and mixtures thereof.

The presently preferred organosulfur-substituted pyridines are 2-(2-mercaptoethyl)pyridine, 2-(2-mercaptoethyl)-5-methylpyridine, 4-mercaptopyridine, 4-(2-mercaptoethyl)pyridine, thionicotinamide, and structurally closely related compounds, and mixtures thereof.

The amount of reinforcing promoter or coupling agent used in this invention is a reinforcing promoting amount sufficient to effectively bond the silica-containing reinforcing material to the rubber. Generally, this amount will be within the broad range of about 0.05 to about 10 phr (parts by weight of reinforcing promoter per hundred parts of rubber) with a preferred range of about 0.5 to about 5 phr.

The rubber component of this invention can be of any type although it is preferred that the rubber be subject to a sulfur type vulcanization and as such should have some degree of unsaturation. Typical rubbers useful in this invention include natural rubber, homopolymers or copolymers of conjugated dienes and monovinylarenes which would include emulsion and solution polymerized rubbers, terpolymers of ethylene, propylene, and a non-conjugated diolefin, butyl rubber, and nitrile rubber. The polymers can be linear or branched. The conjugated dienes suitable are those which ordinarily contain 4 to about 12 carbon atoms per molecule, with those containing 4 to about 8 carbon atoms being preferred, and are exemplified by such as 1,3-butadiene, isoprene, piperylene, 2,3-dimethyl-1,3-butadiene, 3-butyl-1,3-octadiene, 2,-phenyl-1,3-butadiene, and the like. The monovinylarenes suitable are those which ordinarily contain 8 to about 16 carbon atoms per molecule, and are exemplified by styrene, α-methylstyrene, 3-methylstyrene, 4-n-propylstyrene, 4-p-tolylstyrene, 1-vinylnaphthalene, and the like.

The presently preferred diene rubbers are vulcanizable 1,3-butadiene-styrene copolymers (SBR), having a bound styrene content of about 23.5 weight percent and a nominal Mooney viscosity at 100° C. of about 52 prepared by emulsion polymerization. They may or not be oil-extended.

The reinforcing fillers suitable for use in this invention include any type of silica-containing material which is considered to have reinforcing properties. These are often described as siliceous fillers and refer to fillers which are rubber compatible or can be worked into rubber mixtures, said fillers consisting of silicates or silica, or contain silicates or silica and/or contain chemically bound silicates (or silica) in the widest sense, including mixtures of two or more siliceous fillers.

Suitable siliceous fillers include:

(1) Highly dispersed silica (silicon dioxide) having a specified surface area in the range of about 5 to 500, preferably 20 to 250 m$^2$/g (determined with gaseous nitrogen according to the known BET procedure) and with primary particle sizes in the range of about 5 to 500 nm. (nanometer, 10$^{-9}$ meters), which can be produced, for example, by precipitation from solutions of silicates, by hydrolysis and/or oxidative high temperatures conversion. There can also be used flame hydrolysis of volatile silicon halides, e.g., silicon tetrachloride, or electric arc processes. These silicas, in a given case, can also be present as mixed oxides or oxide mixtures with oxides of the metals aluminum (alumina), magnesium (magnesium oxide), calcium (calcium oxide), barium (barium oxide), zinc (zinc oxide), zirconium (e.g., zirconium dioxide), or titanium (e.g., titanium dioxide).

(2) Synthetic silicates, for example, aluminum silicate or alkaline earth silicates such as magnesium, or calcium silicate with specific surface areas of about 10 to about 300 m$^2$/g and primary particle sizes of about 10 to about 400 nm.

(3) Natural silicates, for example, kaolin, wollastonite, talc and asbestos as well as natural silicas.

Typically commercially available and suitable examples of silica for use in this invention includes Hi Sil 233 ® (PPG Industries), Ultrasil ®VN-3 and Aerosil ® (Degussa) and Cabosil ® (Cabot Corp). Generally, precipitated grade silica is the preferred filler due to favorable cost.

Preferred siliceous fillers that can be employed in my inventive, curable rubber compositions include silicas such as finely divided hydrated, amorphous silicas, e.g., those obtained by precipitation of soluble silicates, having a specific gravity ranging from about 1.9 to about 2.2 and an average surface area (measured by nitrogen adsorption) of about 20–300 m$^2$/gram. Other, less preferred siliceous fillers that can be employed include clays, kaolin, hydrated aluminum silicates, magnesium silicates (talc), and calcium silicates. A most suitable filler is Hi Sil 233, a precipitated, hydrated, amorphous silica having a specific gravity of about 2.0, a surface area (BET) of about 140 m$^2$/gram, and being finer than 325 mesh, marketed by PPG Industries.

The siliceous fillers can be added in an amount sufficient to reinforce the rubbery polymer and provide a final rubber product of desirable properties. Generally, the amount of filler will range from about 5 to about 150 parts by weight per hundred parts by weight of rubber.

Appropriate compounding ingredients which are well known in the rubber industry can be employed in the rubbery composition of this invention. These include accelerators, vulcanizing agents such as sulfur and sulfur-yielding compounds, antioxidants, antiozonants, light stabilizers, other fillers, e.g. carbon black, processing aids, and the like.

The sulfur based curing system that can be employed comprises sulfur or a sulfur releasing substance; plus any of the known vulcanization accelerators such as those disclosed in Rubber World Blue Book-Materials, Compounding Ingredients and Machinery for Rubber-Bill Communications, 1982 Edition, pages 17–48, such as N-cyclohexyl-2-benzothiazyl-sulfenamide marketed as Santocure; plus curing activators and mold release agents such as zinc oxide and stearic acid.

The preferred vulcanizable rubber compositions comprise 100 parts by weight of a conjugated diene homo- or copolymer; from about 5 to about 150, more preferably from 30 to 60, parts by weight of siliceous filler per 100 parts by weight of rubber (phr); from about 0.5 to about 5, more preferably from 1 to 2.5, phr of organosulfur-substituted pyridine; from about 1 to 4 phr of at least one curing accelerator; from about 1 to about 5 phr of sulfur or sulfur releasing substance.

The vulcanizable rubber compositions of this invention can be prepared by any of the known mixing means such as a Banbury mixer or a roll mill or a combination of both. The vulcanization of these rubber compositions is preferably carried out by compression molding at a temperature ranging from about 120° C. to 200° C., for a time period ranging from about 10 minutes to 60 minutes, depending on the curing temperature. The presently most preferred curing conditions are: a temperature of 160° C. and a cure time of 30 minutes.

Suitable articles of manufacture that can be made of my inventive rubber compounds comprise tires, tire retreads, soles and the like. In addition, mechanical goods, e.g., hoses and belts, can be manufactured from said compounds by extrusion and low-pressure steam curing.

Examples are provided designed to further an understanding of this invention without limiting the scope thereof. Particular materials, amounts, conditions and the like are designed to be exemplary and are not intended to be limitative of the reasonable scope of this invention.

The rubbery composition formulation used in this invention is considered to be conventional and thus not critical to the successful operation of the invention. The formulation used for evaluation is shown in Recipe I in Example I hereinafter. Variations in the quality of the ingredients or the substitution of other type ingredients is left to the discretion of those skilled in the art. In like manner, the method of mixing of the ingredients accomplished in any suitable mixer and the method for curing or vulcanizing of the formulation is left to the needs and experience of those skilled in the art.

The following examples serve to illustrate the usefulness of organosulfur-substituted pyridine compounds as reinforcing promoters in silica filled sulfur vulcanized compositions.

EXAMPLE I

In this example, the preparation of inventive, vulcanized rubber compositions containing silica filler and various mercapto-pyridine coupling agents is described. Said compositions were prepared according to Recipe I.

Recipe I

|  | Run 1 Control | Run 2 (Invention) | Run 3 (Invention) | Run 4 (Invention) | Run 5 (Invention) |
|---|---|---|---|---|---|
| SBR 1500 Rubber[a], parts by weight | 100 | 100 | 100 | 100 | 100 |
| HiSil 233[b], parts by weight | 40 | 40 | 40 | 40 | 40 |
| Zinc Oxide, parts by weight | 4.0 | 4.0 | 4.0 | 4.0 | 4.0 |
| Stearic Acid, parts by weight | 2.0 | 2.0 | 2.0 | 2.0 | 2.0 |
| Sulfur, parts by weight | 2.8 | 2.8 | 2.8 | 2.8 | 2.8 |
| Altax[c], parts by weight | 1.5 | 1.5 | 1.5 | 1.5 | 1.5 |
| DPG[d], parts by weight | 1.5 | 1.5 | 1.5 | 1.5 | 1.5 |
| Organosulfur-Pyridine Additive | None | [e] | [f] | [g] | [h] |
| Parts by weight of Additive | — | 1.5 | 1.5 | 1.5 | 1.5 |

[a] an emulsion-polymerized butadiene-styrene rubber with a bound styrene content of about 23.5 weight percent, having a nominal Mooney viscosity of 52 at 212° F.;
[b] precipitated, amorphous, hydrated silica having a specific gravity of 2.0, a surface area (BET method) of 140–160 m²/gram, less than 0.5% retained on a 325-mesh screen, average particle diameter of 0.022 microns; marketed by PPG Industries.
[c] benzothiazyl disulfide, a primary accelerator marketed by R. T. Vanderbilt;
[d] diphenyl-guanidine, a secondary accelerator marketed by Harwick Chemical Company;
[e] 2-(2-mercaptoethyl)pyridine

[f] 2-(2-mercaptoethyl)-5-methylpyridine

[g] 4-mercaptopyridine

[h] 4-(2-mercaptoethyl)pyridine

Mixing of the ingredients was carried out as follows: Rubber and silica were compounded on a "BR" Banbury mixer at a speed of 118 rpm, while cold water slowly circulated. The rubber-silica masterbatch was dumped at 160° C., after a mixing time of about 5 minutes, and then sheeted off twice on a 6"×12" roll mill after 1 minute and 2–3 minutes, respectively.

Subsequently, the rubber-silica masterbatch was placed on a roll mill of 2" diameter and remilled at 150° F. Organosulfur substituted pyridines were added after about 10 minutes, followed by milling at about 250° F. for about 3 minutes. Then the curing agents were added after a cooling-down period of 2 minutes. Milling at about 150° F. for 5 minutes and remilling with three tight passes for 3 minutes concluded the compounding operation.

The milled rubber compounds were vulcanized in a compression mold at 160° C. for 30 minutes. Tensile and swelling data were determined on 6"×6" slabs having a thickness of 24 mils.

EXAMPLE II

Properties of vulcanized, silica-filled rubber compounds prepared according to the procedures described in Example I are summarized in Table I.

TABLE I

|  | Run 1 Control | Run 2 (Invention) | Run 3 (Invention) | Run 4 (Invention) | Run 5 (Invention) |
|---|---|---|---|---|---|
| 300%-Modulus[a], psi | 860 | 1650 | 930 | 1410 | 1900 |
| Tensile at Break[a], psi | 2360 | 2175 | 2225 | 1700 | 2395 |
| Elongation[a], % | 565 | 320 | 490 | 350 | 320 |
| Shore A Hardness[b], | 64 | 67 | 63 | 70 | 68 |
| Hysteresis, ΔT[c], °C. | 30.1 | 29.8 | 29.2 | 30.0 | 30.0 |

TABLE I-continued

|  | Run 1 Con-trol | Run 2 (Invention) | Run 3 (Invention) | Run 4 (Invention) | Run 5 (Invention) |
|---|---|---|---|---|---|
| Resilience[d], % | 75 | 71 | 69 | 76 | 73 |
| Minimum Mooney[e] | 55 | 66 | 45 | 76 | 77 |
| Scorch, 5-Point Rise[e], min. | 12.8 | 3.5 | 10.0 | 2.7 | 2.6 |
| $\nu \times 10^4$[f], moles/cc | 2.4 | 3.0 | 2.3 | 3.0 | 3.3 |

[a]determined according to ASTM D412, Method A, employing a CRE-2K tensile tester, at 78°F.
[b]determined according to ASTM D2240, Shore durometer, Type A.
[c]determined according to ASTM D 623, Method A by means of a Goodrich flexometer using a modified specimen size of 0.7" diameter and 1.0" weight.
[d]determined according to ASTM D945, same specimen size as for c).
[e]determined according to ASTM D1646, rotor diameter: 30.48 mm; scorch time was determined for a 5 point rise above minimum Mooney at 140° C.
[f]determined according to the fast swell method described in Rubber World, Vol. 135 (1956), pages 67 and 254, using 6" × 6" slabs of 24 mil thickness which are immersed in n-heptane for 2 hours at 60° C. and 3 hours at 30° C.; the higher $\nu$ the greater the amount of rubber-rubber and/or rubber-filler crosslinking.

Data in Table I show that the addition of mercapto-pyridines to rubber-silica compositions resulted in higher modulus and lower elongation after vulcanization. In three out of four inventive runs, also higher hardness and higher network density ($\nu$) were realized. These results indicate more extensive rubber-rubber crosslinking and/or rubber-filler coupling in the presence of mercapto-pyridines. Inventive rubber compositions were more scorchy than control compositions, whereas tensile strength, hystersis and resilience of the were not consistently affected.

EXAMPLE III

In this example the preparation of inventive, vulcanized rubber compositions were prepared according to Recipe II. Specific mixing and vulcanization procedures were identical to those outlined in Example.

Recipe II

|  | Run 6 Con-trol | Run 7 (Invention) | Run 8 (Invention) | Run 9 (Invention) |
|---|---|---|---|---|
| SBR 1500 Rubber[a], parts by weight | 100 | 100 | 100 | 100 |
| HiSil 233[a], parts by weight | 40 | 40 | 40 | 40 |
| Zinc Oxide, parts by weight | 4.0 | 4.0 | 4.0 | 4.0 |
| Stearic Acid, parts by weight | 2.0 | 2.0 | 2.0 | 2.0 |
| Sulfur, parts by weight | 2.8 | 2.8 | 2.8 | 2.8 |
| Santocure[b], parts by weight | 1.5 | 1.5 | 1.5 | 1.5 |
| Thionicotinamide[c], parts by weight | — | 1.0 | 2.0 | 2.5 |

[a]see footnotes to Recipe I
[b]N—cyclohexyl-2-benzothiazyl sulfenamide, marketed by Harwick Chemical Corporation

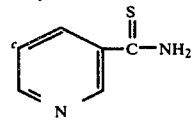

marketed by Aldrich Chemicals Co., product designation: T3165-8.

EXAMPLE IV

Properties of vulcanized, silica filled rubber compounds containing thionicotinamide are summarized in Table II.

TABLE II

|  | Run 6 Con-trol | Run 7 (Invention) | Run 8 (Invention) | Run 9 (Invention) |
|---|---|---|---|---|
| 300%-Modulus[a], psi | 545 | 805 | 785 | 760 |
| Tensile at Break[a], psi | 3210 | 1905 | 1860 | 1355 |
| Elongation[a], % | 850 | 505 | 480 | 425 |
| Shore A Hardness[a] | 57 | 62 | 64 | 63 |
| Hysteresis, $\Delta T^a$, °C. | 45.3 | 36.6 | 38.5 | 37.0 |
| Resilience[a], % | 63 | 66 | 64 | 64 |
| Minimum Mooney[a] | 43 | 58 | 60 | 62 |
| Scorch, 5-Point Rise[a], minutes | 28 | 5.1 | 3.2 | 2.8 |
| $\nu \times 10^4$, moles/cc | 1.6 | 2.2 | 2.1 | 2.2 |

[a]see Footnotes to Table I.

Data in Table II show consistently higher modulus, greater hardness, greater network density ($\nu$), higher resilience, lower hysteresis and lower elongation of inventive compositions with thionicotinamide, indicating greater rubber-rubber and/or rubber-silica coupling. Tensile strength and scorch time were reduced by the presence of thionicotinamide.

We claim:

1. A silica-containing vulcanizable composition comprising:
   (a) a vulcanizable natural or synthetic rubber;
   (b) a siliceous filler; and
   (c) at least one organosulfur-substituted pyridine compound of the formulas

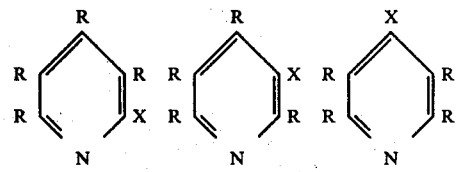

wherein R is hydrogen or an alkyl group having from 1 to about 6, inclusive, carbon atoms per molecule and X is selected from —SR[1], —R[3]—SR[1] and

wherein R[1] and R[2] correspond to R and R[3] is an alkylene radical having from 1 to 4 inclusive carbon atoms per molecule.

2. The product obtained by curing the composition of claim 1.

3. A composition according to claim 1 wherein (a) is a polymer of a conjugated diene.

4. A composition according to claim 1 wherein (a) is a sulfur curable polymer and the composition includes sulfur or a sulfur yielding material.

5. A cured product of claim 4.

6. A composition according to claim 1 wherein (c) is an organosulfur substituted compound in which X is

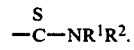

7. A composition according to claim 1 wherein based upon 100 parts of (a), the amount of (b) present ranges from about 5 to about 150 parts and the amount of (c) present ranges from about 0.5 to about 5 parts by weight.

8. A composition according to claim 1 wherein (a) is a butadiene/styrene copolymer and (b) is a precipitated hydrated silica.

9. A composition according to claim 1 wherein (a) is a butadiene/styrene copolymer, (b) is a precipitated hydrated silica, and (c) is 2-(2-mercaptoethyl)pyridine, 2-(2-mercaptoethyl)-5-methylpyridine, 4-mercaptopyridine, 4-(2-mercaptoethyl)pyridine or thionicotinamide.

10. A composition according to claim 9 including sulfur or a sulfur yielding material and a cure accelerator.

11. A process for enhancing the effectiveness of silica-containing materials as reinforcing fillers in vulcanizable rubber compositions which comprises effectively bonding said silica-containing material to the rubber by incorporating therein a promoting amount of at least one organosulfur-substituted pyridine compound having the formula

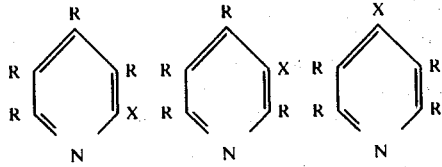

wherein R is hydrogen or an alkyl group having from 1 to about 6, inclusive, carbon atoms per molecule and X is selected from —SR$^1$, —R$^3$—SR$^1$ and

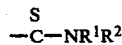

wherein R$^1$ and R$^2$ correspond to R and R$^3$ is an alkylene radical having from 1 to 4 inclusive carbon atoms per molecule and curing the resulting composition.

12. A process according to claim 11 wherein said pyridine compound has the formula

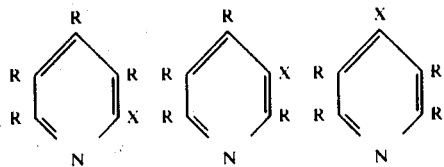

wherein R is hydrogen or an alkyl group having from 1 to about 6, inclusive, carbon atoms per molecule and X is

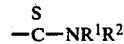

wherein R$^1$ and R$^2$ correspond to R and R$^3$ is an alkylene radical having from 1 to 4 inclusive carbon atoms per molecule and curing the resulting composition.

13. A process according to claim 11 wherein said promoting amount ranges from about 0.5 to about 5 parts by weight per hundred parts by weight of rubber.

14. A process according to claim 11 wherein based upon 100 parts of rubber, the amount of silica-containing material presently is from about 5 to about 150 parts and the amount of pyridine is from about 0.5 to about 5 parts by weight.

15. A process according to claim 11 wherein the rubber is a butadiene/styrene copolymer and the silica-containing material is a precipitated hydrated silica.

16. A process according to claim 11 wherein the rubber is a butadiene/styrene copolymer, the silica-containing material is a precipitated hydrated silica, and the pyridine compound is 2-(2-mercaptoethyl)pyridine, 2-(2-mercaptoethyl)-5-methylpyridine, 4-mercaptopyridine, 4-(2-mercaptoethyl)pyridine or thionicotinamide.

17. A process according to claim 16 including sulfur or sulfur-yielding material and a cure accelerator.

* * * * *